(12) United States Patent
Butteriss

(10) Patent No.: US 7,794,224 B2
(45) Date of Patent: Sep. 14, 2010

(54) APPARATUS FOR THE CONTINUOUS PRODUCTION OF PLASTIC COMPOSITES

(75) Inventor: Edward John Butteriss, Fullerton, CA (US)

(73) Assignee: Woodbridge Corporation, Brodhead, WI (US)

( * ) Notice: Subject to any disclaimer, the term of this patent is extended or adjusted under 35 U.S.C. 154(b) by 1325 days.

(21) Appl. No.: 10/952,186

(22) Filed: Sep. 28, 2004

(65) Prior Publication Data

US 2006/0071369 A1    Apr. 6, 2006

(51) Int. Cl.
B29C 43/48    (2006.01)
(52) U.S. Cl. .................... 425/193; 425/371; 425/817 C
(58) Field of Classification Search ................. 425/4 C, 425/193, 329, 371, 817 C
See application file for complete search history.

(56) References Cited

U.S. PATENT DOCUMENTS

| | | | |
|---|---|---|---|
| 529,535 A | 11/1894 | Smith | |
| 0,529,538 A | 11/1894 | Smith | |
| 2,526,033 A * | 10/1950 | Lyon | 425/371 |
| 2,817,875 A | 12/1957 | Harris et al. | |
| 2,983,693 A | 5/1961 | Sievers | |
| 3,065,500 A | 11/1962 | Berner | |
| 3,071,297 A | 1/1963 | Lee | |
| 3,223,027 A * | 12/1965 | Soda et al. | 425/371 |
| 3,466,705 A | 9/1969 | Richie | |
| 3,528,126 A | 9/1970 | Ernst et al. | |
| 3,644,168 A | 2/1972 | Bonk et al. | |
| 3,698,731 A | 10/1972 | Jost et al. | |
| 3,726,624 A | 4/1973 | Schwarz | |
| 3,736,081 A | 5/1973 | Yovanovich | |
| 3,768,937 A | 10/1973 | Haga et al. | |
| 3,802,582 A | 4/1974 | Brock | |
| 3,816,043 A | 6/1974 | Snelling et al. | |
| 3,819,574 A | 6/1974 | Brown et al. | |
| 3,824,057 A | 7/1974 | Kornylak et al. | |
| 3,830,776 A | 8/1974 | Carlson et al. | |
| 3,832,429 A * | 8/1974 | Charpentier | 425/371 |
| 3,841,390 A * | 10/1974 | DiBenedetto et al. | 425/371 |
| 3,852,387 A * | 12/1974 | Bortnick et al. | 425/371 |
| 3,867,494 A | 2/1975 | Rood et al. | |
| 3,890,077 A | 6/1975 | Holman | |

(Continued)

FOREIGN PATENT DOCUMENTS

DE    2351844    4/1975

(Continued)

OTHER PUBLICATIONS

Cleated Belt Puller, http://www.esi-estrusion.com/cbpuller.htm, Aug. 5, 2002.

(Continued)

*Primary Examiner*—James Mackey
(74) *Attorney, Agent, or Firm*—Catalyst Law Group, APC

(57) ABSTRACT

A continuous production system for fabricating composite articles from a moldable material includes, in an exemplary embodiment, a pair of opposed closed loop cleated belt conveyors spaced apart a predetermined distance. Each cleated belt includes a plurality of cleats, and each cleat includes a notch. The forming system also includes a pair of opposed endless profile mold belts positioned at least partially between the pair of cleated belts. The mold belts are located at least partially in the notches of the cleats.

13 Claims, 6 Drawing Sheets

U.S. PATENT DOCUMENTS

| | | | |
|---|---|---|---|
| 3,917,547 A | 11/1975 | Massey |
| 3,917,774 A | 11/1975 | Sagane et al. |
| 3,981,654 A | 9/1976 | Rood et al. |
| 3,991,005 A | 11/1976 | Wallace |
| 3,999,320 A | 12/1976 | Bruning et al. |
| 4,042,314 A | 8/1977 | Bruning et al. |
| 4,051,742 A * | 10/1977 | Johansson et al. ........... 474/104 |
| 4,060,579 A | 11/1977 | Schmitzer et al. |
| 4,065,410 A | 12/1977 | Schafer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer |
| 4,143,759 A | 3/1979 | Paradis |
| 4,149,840 A | 4/1979 | Tippmann |
| 4,153,768 A | 5/1979 | Blount |
| 4,160,749 A | 7/1979 | Schneider et al. |
| 4,163,824 A | 8/1979 | Saidla |
| 4,164,439 A * | 8/1979 | Coonrod ..................... 425/371 |
| 4,165,414 A | 8/1979 | Narayan et al. |
| 4,180,538 A | 12/1979 | Morikawa et al. |
| 4,210,572 A | 7/1980 | Herman et al. |
| 4,214,864 A | 7/1980 | Tabler |
| 4,221,877 A | 9/1980 | Cuscurida et al. |
| 4,243,755 A | 1/1981 | Marx et al. |
| 4,247,656 A | 1/1981 | Janssen |
| 4,248,975 A | 2/1981 | Satterly |
| 4,254,002 A | 3/1981 | Sperling et al. |
| 4,254,176 A | 3/1981 | Müller et al. |
| 4,256,846 A | 3/1981 | Ohasi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulber, Jr. |
| 4,290,248 A | 9/1981 | Kemerer et al. |
| 4,300,776 A | 11/1981 | Taubenmann |
| 4,330,494 A | 5/1982 | Iwata et al. |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,439,548 A | 3/1984 | Weisman |
| 4,450,133 A | 5/1984 | Cafarelli |
| 4,460,737 A | 7/1984 | Evans et al. |
| 4,489,023 A | 12/1984 | Proksa |
| 4,512,942 A | 4/1985 | Babbin et al. |
| 4,532,098 A | 7/1985 | Campbell et al. |
| 4,540,357 A | 9/1985 | Campbell et al. |
| 4,576,718 A | 3/1986 | Reischl et al. |
| 4,595,709 A | 6/1986 | Reischl |
| 4,597,927 A | 7/1986 | Zeitler et al. |
| 4,604,410 A | 8/1986 | Altenberg |
| 4,649,162 A | 3/1987 | Roche et al. |
| 4,677,157 A | 6/1987 | Jacobs |
| 4,714,778 A | 12/1987 | Burgoyne, Jr. et al. |
| 4,717,027 A | 1/1988 | Laure et al. |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,826,944 A | 5/1989 | Hoefer et al. |
| 4,832,183 A | 5/1989 | Lapeyre |
| 4,835,195 A | 5/1989 | Rayfield et al. |
| 4,855,184 A | 8/1989 | Klun et al. |
| 4,892,891 A | 1/1990 | Close |
| 4,895,352 A | 1/1990 | Stumpf |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |
| 5,051,222 A | 9/1991 | Marten et al. |
| 5,091,436 A | 2/1992 | Frisch et al. |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,149,722 A | 9/1992 | Soukup |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,252,697 A | 10/1993 | Jacobs et al. |
| 5,296,545 A | 3/1994 | Heise |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,455,312 A | 10/1995 | Heidingsfeld et al. |
| 5,458,477 A * | 10/1995 | Kemerer et al. ............. 425/371 |
| 5,491,174 A | 2/1996 | Grier et al. |
| 5,505,599 A | 4/1996 | Kemerer et al. |
| 5,508,315 A | 4/1996 | Mushovic |
| 5,527,172 A | 6/1996 | Graham, Jr. |
| 5,532,065 A | 7/1996 | Gubitz et al. |
| 5,536,781 A | 7/1996 | Heidingsfeld et al. |
| 5,554,713 A | 9/1996 | Freeland |
| 5,565,497 A | 10/1996 | Godbey et al. |
| 5,567,791 A | 10/1996 | Brauer et al. |
| 5,569,713 A | 10/1996 | Lieberman |
| 5,582,840 A | 12/1996 | Pauw et al. |
| 5,604,266 A | 2/1997 | Mushovic |
| 5,611,976 A | 3/1997 | Klier et al. |
| 5,621,024 A | 4/1997 | Eberhardt et al. |
| 5,631,103 A | 5/1997 | Eschbach et al. |
| 5,631,319 A | 5/1997 | Reese et al. |
| 5,643,516 A | 7/1997 | Raza et al. |
| 5,681,915 A | 10/1997 | Lechner et al. |
| 5,688,890 A | 11/1997 | Ishiguro et al. |
| 5,696,205 A | 12/1997 | Muller et al. |
| 5,700,495 A | 12/1997 | Kemerer et al. |
| 5,759,695 A | 6/1998 | Primeaux, II |
| 5,760,133 A | 6/1998 | Heidingsfeld et al. |
| 5,783,125 A | 7/1998 | Bastone et al. |
| 5,783,629 A | 7/1998 | Srinivasan et al. |

| | | | | | | |
|---|---|---|---|---|---|---|
| 5,795,949 A | 8/1998 | Daute et al. | | 6,881,764 B2 | 4/2005 | Doesburg et al. |
| 5,811,506 A | 9/1998 | Slagel | | 6,903,156 B2 | 6/2005 | Muller et al. |
| 5,817,402 A | 10/1998 | Miyake et al. | | 6,908,573 B2 | 6/2005 | Hossan |
| 5,844,015 A | 12/1998 | Steilen et al. | | 6,916,863 B2 | 7/2005 | Hemmings et al. |
| 5,908,701 A | 6/1999 | Jennings et al. | | 6,962,636 B2 | 11/2005 | Kurth et al. |
| 5,929,153 A | 7/1999 | Mori et al. | | 6,971,495 B2 | 12/2005 | Hedrick et al. |
| 5,945,460 A | 8/1999 | Ekart et al. | | 6,979,477 B2 | 12/2005 | Kurth et al. |
| 5,952,053 A | 9/1999 | Colby | | 6,979,704 B1 | 12/2005 | Mayer et al. |
| 5,962,144 A | 10/1999 | Primeaux, II | | 6,989,123 B2 | 1/2006 | Lee et al. |
| 5,981,655 A | 11/1999 | Heidingsfeld et al. | | 6,997,346 B2 | 2/2006 | Landers et al. |
| 6,019,269 A | 2/2000 | Mullet et al. | | 7,063,877 B2 | 6/2006 | Kurth et al. |
| 6,020,387 A | 2/2000 | Downey et al. | | 7,132,459 B1 | 11/2006 | Buchel |
| 6,040,381 A | 3/2000 | Jennings et al. | | 7,160,976 B2 | 1/2007 | Lühmann et al. |
| 6,051,634 A | 4/2000 | Laas et al. | | 7,188,992 B2 | 3/2007 | Mattingly, Jr. |
| 6,055,781 A | 5/2000 | Johanson | | 7,196,124 B2 | 3/2007 | Parker et al. |
| 6,096,401 A | 8/2000 | Jenkines | | 7,211,206 B2 * | 5/2007 | Brown et al. ................ 425/371 |
| 6,103,340 A | 8/2000 | Kubo et al. | | 7,316,559 B2 * | 1/2008 | Taylor ........................ 425/371 |
| 6,107,433 A | 8/2000 | Petrovic et al. | | 2001/0009683 A1 | 7/2001 | Kitahama et al. |
| 6,140,381 A | 10/2000 | Rosthauser et al. | | 2002/0034598 A1 | 3/2002 | Bonk et al. |
| 6,177,232 B1 | 1/2001 | Melisaris et al. | | 2002/0045048 A1 | 4/2002 | Bonk et al. |
| 6,180,686 B1 | 1/2001 | Kurth | | 2002/0048643 A1 | 4/2002 | Bonk et al. |
| RE37,095 E | 3/2001 | Glorioso et al. | | 2002/0171164 A1 | 11/2002 | Halterbaum et al. |
| 6,204,312 B1 | 3/2001 | Taylor | | 2002/0192456 A1 | 12/2002 | Mashburn et al. |
| 6,211,259 B1 | 4/2001 | Borden et al. | | 2003/0021915 A1 | 1/2003 | Rohatgi et al. |
| 6,224,797 B1 | 5/2001 | Franzen et al. | | 2003/0083394 A1 | 5/2003 | Clatty |
| 6,252,031 B1 | 6/2001 | Tsutsumi et al. | | 2003/0090016 A1 | 5/2003 | Petrovic et al. |
| 6,257,643 B1 | 7/2001 | Young | | 2003/0143910 A1 | 7/2003 | Mashburn et al. |
| 6,257,644 B1 | 7/2001 | Young | | 2003/0158365 A1 | 8/2003 | Brauer et al. |
| 6,258,310 B1 | 7/2001 | Sardanopoli et al. | | 2003/0232933 A1 | 12/2003 | Lagneaux et al. |
| 6,258,917 B1 | 7/2001 | Slagel | | 2004/0049002 A1 | 3/2004 | Andrews et al. |
| 6,264,462 B1 | 7/2001 | Gallagher | | 2004/0121161 A1 | 6/2004 | Shugert et al. |
| 6,284,841 B1 | 9/2001 | Friesner | | 2004/0198900 A1 | 10/2004 | Madaj |
| 6,294,637 B1 | 9/2001 | Braüer et al. | | 2004/0266993 A1 | 12/2004 | Evans |
| 6,297,321 B1 | 10/2001 | Onder et al. | | 2005/0011159 A1 | 1/2005 | Standal et al. |
| 6,309,507 B1 | 10/2001 | Morikawa et al. | | 2005/0031578 A1 | 2/2005 | Deslauriers et al. |
| 6,312,244 B1 | 11/2001 | Levera et al. | | 2005/0079339 A1 | 4/2005 | Riddle |
| 6,321,904 B1 | 11/2001 | Mitchell | | 2005/0131092 A1 | 6/2005 | Kurth et al. |
| 6,343,924 B1 | 2/2002 | Klepsch | | 2005/0131093 A1 | 6/2005 | Kurth et al. |
| 6,348,514 B1 | 2/2002 | Calabrese et al. | | 2005/0161855 A1 | 7/2005 | Brown et al. |
| 6,387,504 B1 | 5/2002 | Mushovic | | 2005/0171243 A1 | 8/2005 | Hemmings et al. |
| 6,409,949 B1 | 6/2002 | Tanaka et al. | | 2005/0182228 A1 | 8/2005 | Kurth |
| 6,429,257 B1 | 8/2002 | Buxton et al. | | 2005/0260351 A1 | 11/2005 | Kurth et al. |
| 6,432,335 B1 | 8/2002 | Ladang et al. | | 2005/0287238 A1 | 12/2005 | Taylor |
| 6,433,032 B1 | 8/2002 | Hamilton | | 2006/0014891 A1 | 1/2006 | Yang et al. |
| 6,433,121 B1 | 8/2002 | Petrovic et al. | | 2006/0041155 A1 | 2/2006 | Casper |
| 6,455,605 B1 | 9/2002 | Giorgini et al. | | 2006/0041156 A1 | 2/2006 | Casper et al. |
| 6,458,866 B1 | 10/2002 | Oppermann et al. | | 2006/0045899 A1 | 3/2006 | Sarangapani |
| 6,465,569 B1 | 10/2002 | Kurth | | 2006/0071369 A1 | 4/2006 | Butteriss |
| 6,467,610 B1 | 10/2002 | MacLachlan | | 2006/0217517 A1 | 9/2006 | Daly |
| 6,469,667 B2 | 10/2002 | Fox et al. | | 2006/0270747 A1 | 11/2006 | Griggs |
| 6,485,665 B1 | 11/2002 | Hermanutz et al. | | 2007/0037953 A1 | 2/2007 | Geiger et al. |
| 6,534,617 B1 | 3/2003 | Batt et al. | | 2007/0052128 A1 | 3/2007 | Taylor |
| 6,541,534 B2 | 4/2003 | Allen et al. | | 2007/0066697 A1 | 3/2007 | Gilder et al. |
| 6,552,660 B1 | 4/2003 | Lisowski | | | | |
| 6,555,199 B1 | 4/2003 | Jenkines | | FOREIGN PATENT DOCUMENTS | | |
| 6,571,935 B1 | 6/2003 | Campbell et al. | | GB | 2347933 | 9/2000 |
| 6,573,309 B1 | 6/2003 | Reitenbach et al. | | JP | 5580456 | 6/1980 |
| 6,573,354 B1 | 6/2003 | Petrovic et al. | | JP | 58-132533 | 8/1983 |
| 6,605,343 B1 | 8/2003 | Motoi et al. | | JP | 63-22819 | 1/1988 |
| 6,617,009 B1 | 9/2003 | Chen et al. | | JP | 63-202408 | 8/1988 |
| 6,624,244 B2 | 9/2003 | Kurth | | JP | 5-285941 | 11/1993 |
| 6,641,384 B2 | 11/2003 | Bosler et al. | | JP | 7-76395 | 3/1995 |
| 6,649,084 B2 | 11/2003 | Morikawa et al. | | JP | 7-313941 | 12/1995 |
| 6,649,667 B2 | 11/2003 | Clatty | | JP | 8-188634 | 7/1996 |
| 6,686,435 B1 | 2/2004 | Petrovic et al. | | JP | 11-171960 | 6/1999 |
| 6,695,902 B2 | 2/2004 | Hemmings et al. | | JP | 2004-131654 | 4/2004 |
| 6,706,774 B2 | 3/2004 | Munzenberger et al. | | JP | 2005-138567 | 6/2005 |
| 6,769,220 B2 | 8/2004 | Friesner | | KR | 20020086327 | 11/2002 |
| 6,849,676 B1 | 2/2005 | Shibano et al. | | WO | 97/44373 | 11/1977 |
| 6,864,296 B2 | 3/2005 | Kurth | | WO | 81/03026 | 10/1981 |
| 6,867,239 B2 | 3/2005 | Kurth | | WO | 87/05541 | 9/1987 |
| 6,871,457 B2 | 3/2005 | Quintero-Flores et al. | | WO | 91/00304 | 1/1991 |
| 6,881,763 B2 | 4/2005 | Kurth | | | | |

| | | |
|---|---|---|
| WO | 92/07892 | 5/1992 |
| WO | 93/19110 | 9/1993 |
| WO | 93/24549 | 12/1993 |
| WO | 94/25529 | 11/1994 |
| WO | 94/27697 | 12/1994 |
| WO | 9711114 | 3/1997 |
| WO | 9808893 | 3/1998 |
| WO | 9939891 | 8/1999 |
| WO | 00/17249 | 3/2000 |
| WO | 01/72863 | 10/2001 |
| WO | 02/01530 | 1/2002 |
| WO | 2004078900 | 9/2004 |
| WO | 2004113248 | 12/2004 |
| WO | 2005053938 | 6/2005 |
| WO | 2005056267 | 6/2005 |
| WO | 2006012149 | 6/2005 |
| WO | 2005072187 A3 | 10/2005 |
| WO | 2005094255 | 10/2005 |
| WO | 2005-123798 | 12/2005 |
| WO | 2006137672 A1 | 12/2006 |

OTHER PUBLICATIONS

RDN Manufacturing Co., Inc., 140, 148 & 160 Belt Pullers, http://www.rdnmfg.com/products/pull140_160.htm, Aug. 5, 2002.
McMaster-Carr, Excerpts from Catalog, pp. 1052-1053.
Custom Downstream Systems, Excerpts from Catalog, 19 pages including cover page.
Deposition of Thomas E. Jurgensen, pp. 1-407 (Jan. 9, 2006) redacted.
Deposition of Daniel Klempner, pp. 1-120 (Jan. 6, 2006) redacted.
Summary of Opinions, Daniel Klempner, pp. 1-11 (Jan. 4, 2006) redacted.
Deposition of John R. Taylor, pp. 1-388 (Dec. 7, 2005) redacted.
Deposition of Fyodor Shutov vol. 1, pp. 1-312 (Dec. 15, 2005) redacted.
Deposition of Fyodor Shutov, vol. 2, pp. 1-182 (Dec. 28, 2005) redacted.
Deposition of Wade Brown, vol. 1, pp. 1-212 (Nov. 17, 2005) redacted.
Deposition of Wade Brown, ol. 2, pp. 1-256 (Nov. 18, 2005) redacted.
Deposition of Wade Brown, vol. 3, pp. 1-302 (Nov. 21, 2005) redacted.
Deposition of Edward J. Butteriss, vol. 1, pp. 1-501 (Dec. 16, 2005) redacted.
Deposition of Edward J. Butteriss, vol. 2, pp. 1-195 (Dec. 28, 2005) redacted.
Deposition of Zachary R. Taylor, vol. 1, pp. 1-221 (Dec. 29, 2005) redacted.
Deposition of Zachary R. Taylor, vol. 2, pp. 1-285 (Jan. 5, 2006) redacted.
Bayer Material Science, Product Index—Polyurethane Raw Materials Prepolymers and Systems (2006).
Bayer Material Science, Multranol 4035—Polyether Polyol, CAS No. 9049-71-2, Product Code: K114 (1997).
Bayer Material Science, Arcol LG-56—Polyether Polyol, CAS No. 25791-96-2, Product Code: KLLG56 (2003).
Bayer Material Science, Multranol 3900—Polyether Polyol (2006).
Tenibac-Graphion, Inc., Texturing Technologists, Brochure, Oct. 1, 1997.
Krishnamurthi, B. et al., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.
Nosker, Thomas J. et al., Fiber Orientation and Creation of Structural Plastic Lumber, Plastics Engineering, Jun. 1999, pp. 53-56.
Bledzki, Andrzej K. et al., Impact Properties of Natural Fiber-Reinforced Epoxy Foams, Journal of Cellular Plastics, vol. 35, Nov. 1999, pp. 550-562.
Frisch, K.C. et al., Hybrid IPN-Foam Composites, Cellular Polymers, Papers from a Three-day International Conference organized by Rapra Technology Limited, Mar. 20-22, 1991.
Shutov, F.A., Excerpts from Integral/Structural Polymer Foams: Technology, Properties and Applications, 1986, pp. including preface, 3-4, 8-9, 13, 23-25, 131-134, 153-158, 167, 171, 176-179, 256.
Klempner, D., ed., et al., Excerpts from Handbook of Polymeric Foams and Foam Technology, 2d ed., 2004, pp. 121-124, 126, 128, 129, Hanser Publishers, Munich.
Randall, D., ed., et al., Excerpts from "The polyurethanes book", 2002, pp. 1, 166-167, 210-213, 229-231, 263-264, Dunholm Publicity Ltd., United Kingdom.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario, Canada.
Elias, H., Excerpts from "An Introduction to Polymer Science", 1997, pp. 408-409, VCH Publishers, Inc., New York.
Chawla, K.K., Excerpts from "Composite Materials: Science and Engineering", 1987, pp. 89-92, Spring-Verlag, New York, NY.
National Center for Environmental Research and Quality Assurance, Office of Research and Development, U.S. Environmental Protection Agency, Abstract of "The Use of Multi-Component Waste Products for Use in Roofing Materials," May 9, 1998.
Energy Efficient Building Products from Waste Materials, Development and Demonstration Project, Proposal, Sep. 10, 1999, NYS Energy Research and Development Authority.
Foamed Recyclables: New Process Efficiently Transforms Solid Waste into Synthetic Building Materials, Jan. 2002, United States Department of Energy, Office of Industrial Technologies, Inventions and Innovations Program.
"Achieving a Wood Grain Finish Effect," dated Dec. 11, 2003, http://www.sculpt.com/technogtes/woodgrainfinish.htm.
Century-Board USA LLC, co-pending U.S. Appl. No. 11/417,385, filed May 4, 2006, titled Continuous Forming System Utilizing up to Six Endless Belts.
Century-Board USA LLC, co-pending U.S. Appl. No. 11/593,316, filed Nov. 6, 2006, titled Method for Molding Three-Dimensional Foam Products Using Continuous Forming Apparatus.
Oertel, G., ed., Polyurethane Handbook Second Edition, pp. 136, 182-183, 252-253, Carl Hanser, Vertag, Munich (1994).
Urethane Soy Systems Company, Material Safety Data Sheet, SoyTherm 50 A-side, pp. 108.
Urethane Soy Systems Company, Material Safety Data Sheet, SoyTherm 50 B-side, pp. 1-8.
Guo et al., "Rigid Urethane Foams from a Soy Polyol-Dod Hybrid," USDA Agricultural Research Service, http://ars.usda.gov/research/publications.htm?SEQ_NO_115=145249 (May 9, 2003).
Guo et al., "Polyols and Polyurethanes from Hydroformylation of Soybean Oil," Journal of Polymers and the Environment 10(1-2):49-52 (Apr. 2002).
Pollack, "Soy vs. Petro Polyols A Life-Cycle Comparison," Omni Tech International, Ltd. (date unknown).
Petrovic et al., "Industrial Oil Products Program," AOCS Archives (2007).
Soyol Polyols and Systems Product Descriptions (available at www.soyol.com).
International Search Report issued in International Application No. PCT/US2007/007468 on Nov. 19, 2007.

* cited by examiner

APPARATUS FOR THE CONTINUOUS PRODUCTION OF PLASTIC COMPOSITES

BACKGROUND OF THE INVENTION

This invention relates generally to apparatus for the production of plastic composites, and more particularly to continuous production systems for the production of plastic composites, for example, thermoplastic and thermosetting materials, including foams, and fillers.

Known techniques for continuously forming moldable materials include, for example, the use of spaced apart conveyor belts with or without profiled belt faces for imparting surface features to the molded material. The moldable material is deposited between the spaced apart conveyors and cures as the material moves along the length of the conveyor. However, imparting surface features to the side surfaces of the molded article is difficult. Typically, the molded material is cut to the desired width rather than being molded to a set width. Also, the conveyor belts do not apply pressure to the product to achieve a structural modification of the product, for example, variable density cross-section and sandwich-like structures.

Another known technique is to use two mated mold or profiled belts that receive the moldable material and convey the material as it cures. However, these types of forming apparatus typically require mold belts with relatively thick side walls to minimize the deflection of the unsupported side walls during the molding process. Further, the top and bottom mold belt must be supported to prevent the mold belts from gaping and permitting material to leak from the mold belts.

BRIEF DESCRIPTION OF THE INVENTION

In one aspect, an apparatus for the continuous production of molded composite materials is provided. In an exemplary embodiment, the continuous forming system includes a first drive conveyor, and a second drive conveyor opposed to the first drive conveyor. The first and second drive conveyors are spaced apart. The continuous forming system also includes a first mold belt and a second opposed mold belt. The first and second mold belts are located between the first and second drive conveyors. The drive conveyors provide support for the mold belts and apply positive pressure to the mold belts.

In another aspect, a continuous production system for fabricating composite articles from a moldable material is provided. In an exemplary embodiment, the continuous production system includes a pair of opposed closed loop cleated belt conveyors spaced apart a predetermined distance. Each cleated belt includes a plurality of cleats, and each cleat includes a notch. The forming system also includes a pair of opposed endless profile mold belts positioned at least partially between the pair of cleated belts. The mold belts are located at least partially in the notches of the cleats.

In another aspect, a method of forming a moldable material into a predetermined shape is provided. In an exemplary embodiment, the method includes the steps of injecting the moldable material into a mold cavity defined by two mated profile mold belts of a continuous production unit, moving the moldable material through the continuous production unit by longitudinal movement of the mold belts, imparting a positive pressure of at least about 10 pounds per square inch to the two mold belts, curing the moldable material in the mold cavity to form a molded article, and removing the molded article from the mold cavity. The continuous production unit includes a first cleated belt and a second cleated belt opposed to the first cleated belt. The first and second cleated belts are spaced apart. The continuous production unit also includes a first mold belt and a second opposed mold belt. The first and second mold belts are located between the first and second cleated belts.

DETAILED DESCRIPTION OF THE INVENTION

Figure 1:
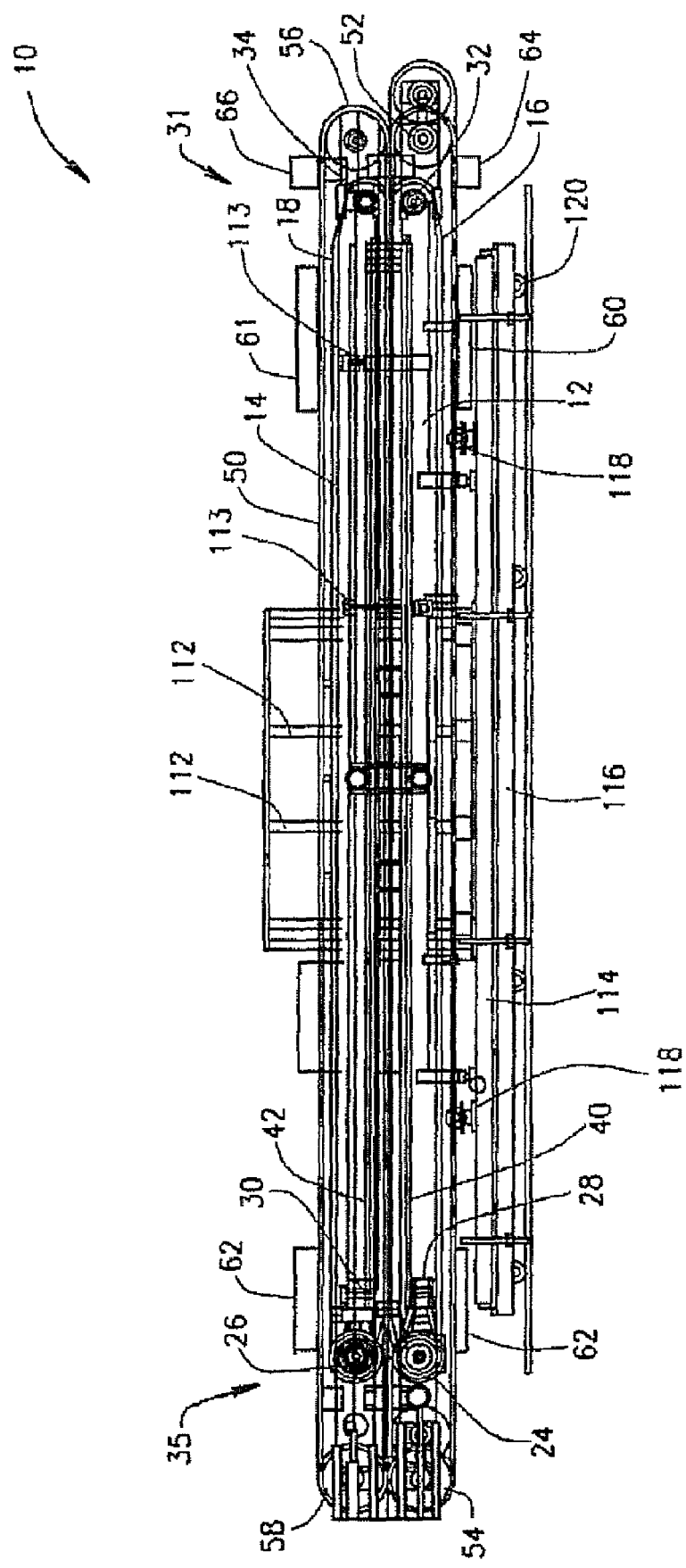
FIG. 1 is a side schematic illustration of a continuous production system in accordance with an embodiment of the present invention.

An apparatus for continuous production of composite materials is described below in detail. The composite materials include plastics, such as thermoplastic and thermosetting materials used as a binder, particulate filler and mineral fiber filler. The thermoplastic and thermosetting materials can include foams. The apparatus permits the production of various single and multi layered products for the construction, railway, furniture and other industries, for example, boards, frames, panels and structural members. The products can have flat, textured, relief or raised surfaces, and can have various cross-sectional shapes, such as square, rectangular, tubular or oval. The products can vary in cross-section with length and can vary in length.

All chemical, physical and mechanical processes for continuous formation of final products are realized within the same apparatus using just a few processing parameters. The apparatus permits simultaneous control of the density, chemical structure, physical structure, surface texture, cross section and size of the final composites. The apparatus permits the density distribution of the final composites to be regulated within the cross section of the product, varying from uniform to non-uniform (integral or sandwich-like structures). This permits the strength of the product to be controlled without changing the chemical formulation of the initial composition.

The apparatus is adjustable to accept any type of feeders supplying liquid formulation based on premixed thermosetting foams containing mineral fillers and additive ingredients. The feeders can be any type of metering, mixing, pumping, pouring and delivering equipment, such as mixing heads, extruders, pumps, feeders, and the like.

In one embodiment, the apparatus, produces composite materials consisting of polyurethane foams filled with a mineral filler, such as fly ash, and mineral fiber. The initial liquid formulation is prepared and fed to the apparatus by any type of metering, mixing, pumping, pouring and delivering equipment, such as mixing heads, extruders, pumps, feeders, and the like. Inside the apparatus the delivered formulation undergoes various chemical, physical and mechanical transformations, such as foaming, curing, densification, structural layering, shaping, texturing and solidification to produce a continuous solid product at the exit of the apparatus where a cutting tool is used to cut final materials of any length.

The apparatus, in one exemplary embodiment, is suitable to mold various moldable materials, for example, thermoplastic materials and thermosetting plastic materials including additives such as fillers, fiber reinforcing materials, and the like. The apparatus is also suitable for forming, for example, thermosetting and thermoplastic foams. In an exemplary embodiment, the apparatus is a continuous production system that includes a first cleated belt, and a second cleated belt opposed to and spaced apart from the first cleated belt. The continuous production system also includes a first mold belt and a second opposed mold belt. The first and second mold belts are located between the first and second cleated belts. Each cleated belt includes a plurality of cleats with each cleat having a notch sized and shaped to receive a mold belt. The notches in the cleats hold the mold belts in position and provide a side support to the mold belts. The side walls of the notches and the side walls of the mold belts are angled to facilitate the mold belt sliding into the notch. The continuous production system provides a positive pressure onto the mold belts to prevent expansion of a moldable foam material from distorting the shape of the mold belts during the foaming and curing of the moldable material. Further, it has been found that a positive pressure applied to the mold belts produces a molded article with superior properties to a molded article formed without pressure applied to the mold belts.

Figure 2:
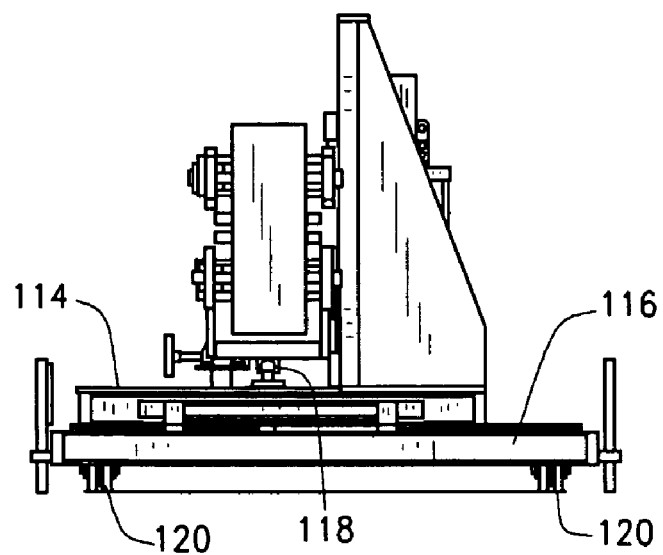
FIG. 2 is a front schematic illustration of the continuous production system shown in FIG. 1.
Figure 3:
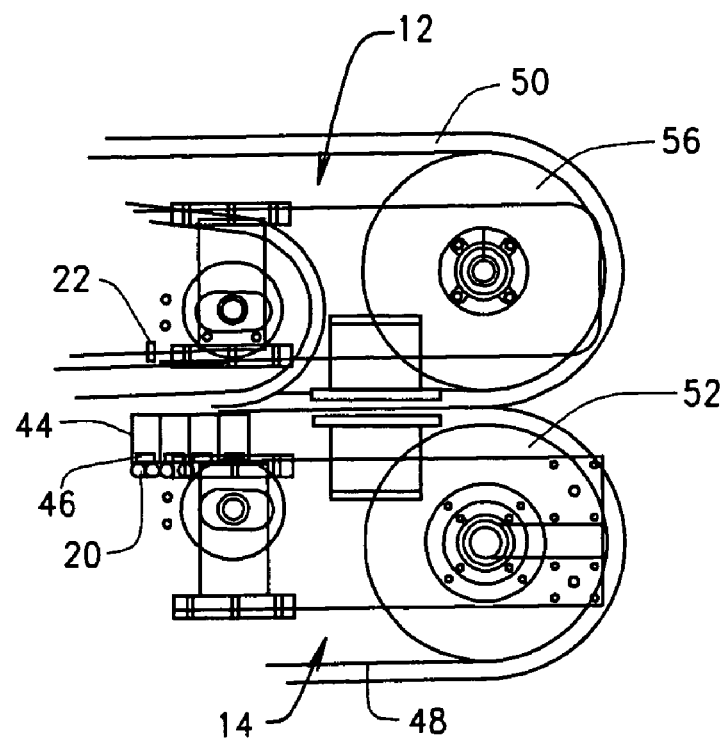
FIG. 3 is an enlarged schematic illustration of the cleated belt pulleys of the continuous production system shown in FIG. 1.

Referring to the drawings, FIG. 1 is a side schematic illustration of an exemplary embodiment of a continuous production system 10. FIG. 2 is a front schematic illustration of continuous production system 10, and FIG. 3 is an enlarged schematic illustration of the cleated belt pulleys of continuous production system 10. Referring to FIGS. 1-3, in an exemplary embodiment, continuous production system 10 includes a pair of opposed closed loop cleated belt conveyors 12 and 14 that are spaced apart from each other. Conveyors 12 and 14 include cleated belts 16 and 18 respectively. The base of each cleated belt 16 and 18 includes chains 20 and 22 respectively. Chains 20 and 22 rotate over drive sprockets 24 and 26 respectively with drive sprockets 24 and 26 operatively connected respectively to variable speed motors 28 and 30. Idler sprockets 32 and 34 are mounted at a first end portion 31 of production system 10 and drive sprockets 24 and 26 are mounted at a second end portion 35 of forming system 10. Chains 20 and 22 continuously rotate over drive sprockets 24 and 26 and idler sprockets 32 and 34. Chains 20 and 22 are kept in position by channels (not shown) in plates 40 and 42 which extend between drive sprockets 24 and 26 and idler sprockets 32 and 34. Plates 40 and 42 can be made from any suitable material that has strength to provide support for chains 20 and 22, for example steel and high density plastic. Belts 16 and 18 include a plurality of cleats 44 attached to chains 20 and 22 by attachment plates 46 which are coupled to chain 20 or 22. In one embodiment, cleats 44 are removable from attachment plates 46.

Continuous mold belts 48 and 50 are positioned at least partially between cleated belts 16 and 18. Particularly, mold belt 48 extends around cleated belt 16 and idler pulleys 52 and 54. Mold belt 50 extends around cleated belt 18 and idler pulleys 56 and 58. Idler pulleys 52, 54, 56, and 58 are located beyond the ends of cleated belts 16 and 18. Mold belts 48 and 50 are substantially U-shaped and mate together longitudinally to form a continuously rotating rectangular shaped mold cavity 60 (see FIG. 5). Mold belts 48 and 50 are made from any suitable material, for example, fluoroelastomers, isobutylene isoprene, nitrile, neoprene, and silicone elastomers, and combinations thereof. Mold belts 48 and 50 can also include reinforcing fibers, for example, glass, carbon, cotton, aramid, polyester, and nylon fibers, and combinations thereof. Heating elements 61 and coolers 62 provide for preliminary heating and operating temperature control of mold belts 48 and 50, which affects the skin and strength characteristics of the composite product.

Figure 4:
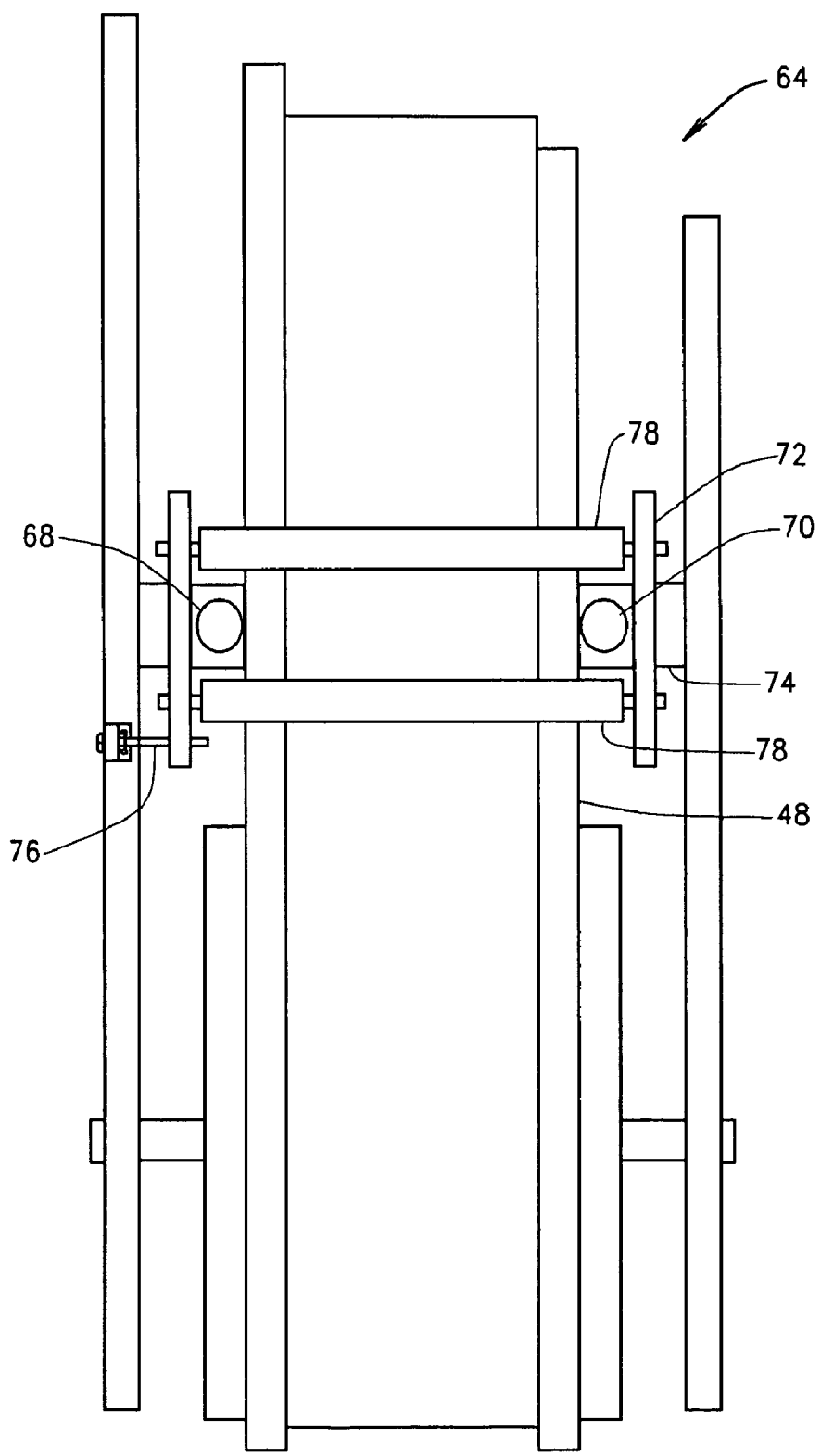
FIG. 4 is a plan schematic illustration of the mold belt guide system shown in FIG. 1.
Figure 5:
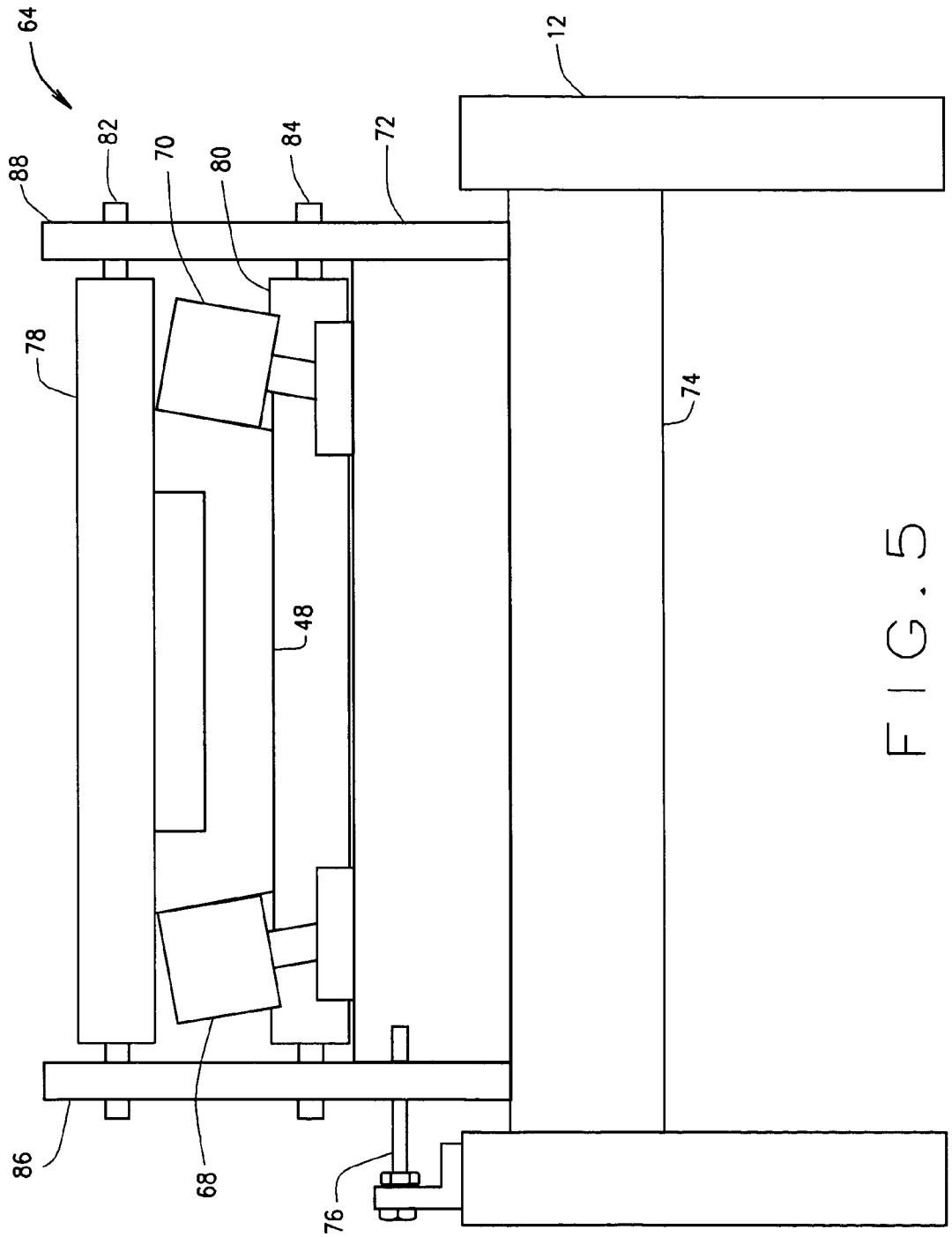
FIG. 5 is a elevation schematic illustration of the mold belt guide system shown in FIG. 1.
Figure 6:
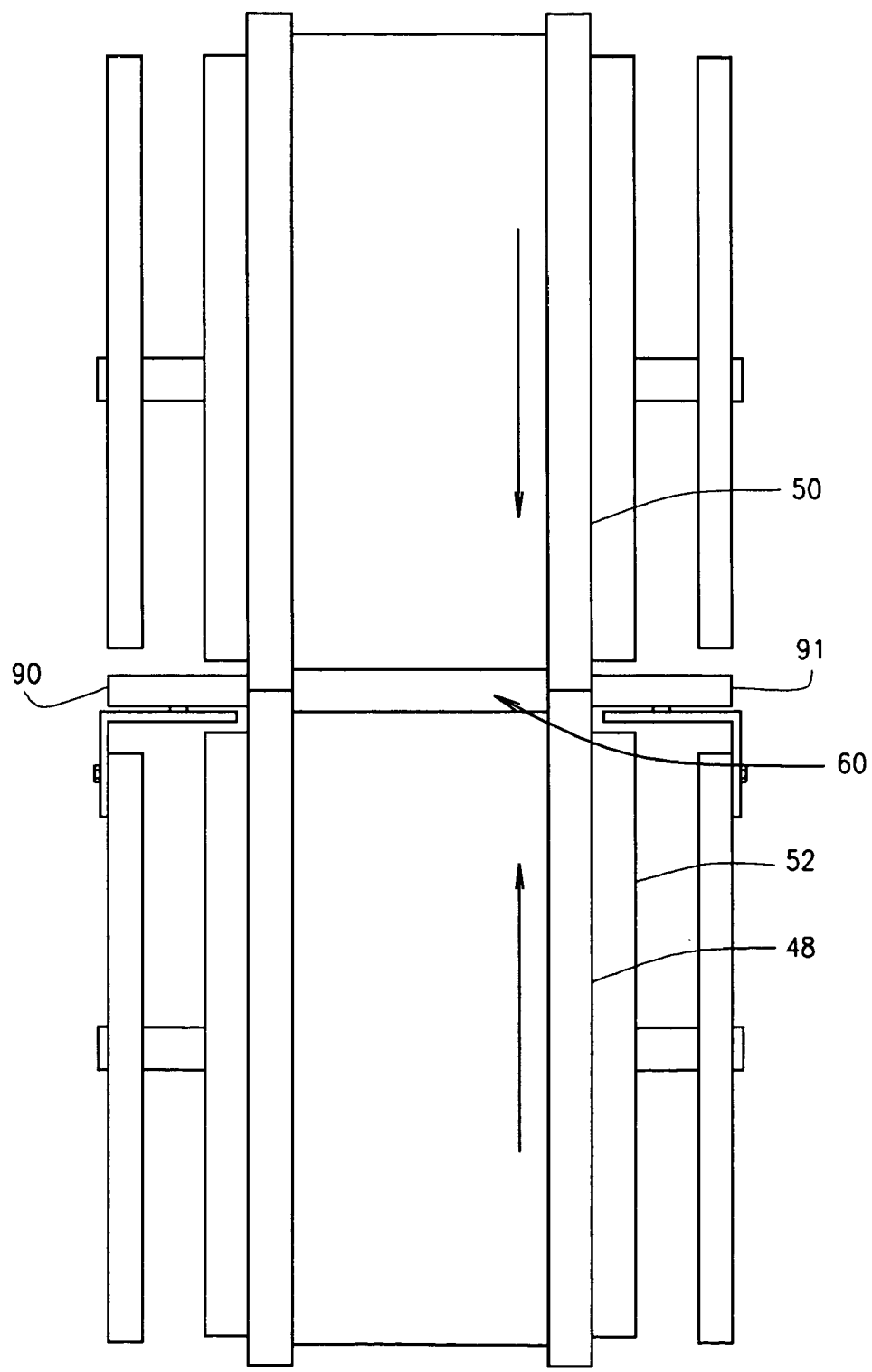
FIG. 6 is an elevation schematic illustration of the mold belt guide system shown in FIG. 1.

Referring also to FIGS. 4-5, mold belt tracking systems 64 and 66 are mounted on closed loop conveyors 12 and 14 respectively. Tracking systems align the upper and lower mold belts 48 and 50 such that the inner edges of mold belts 48 and 50 are precisely located relative to each other at the point at which they come together to eliminate any mismatch in mold cavity 60. In the exemplary embodiment, tracking systems 64 and 66 position mold belts 48 and 50 on idler pulleys 52 and 54. FIGS. 4 and 5 show mold belt tracking system 64. Mold belt tracking system 66 is identical to tracking system 64 Two idler rollers 68 and 70 hold mold belt 48 in position from either side. Rollers 68 and 70 are mounted on a sliding carriage 72 that is movable from side to side along stationary carriage 74 which is attached to the frame of conveyor 12. A lead screw 76 is attached to sliding carriage 72 to adjust the position of sliding carriage 72 relative to stationary carriage 74. Mold belt 48 is held in position by first and second roller pairs 78 and 80 with spring loaded axles 82 and 84 that are attached to upper portions 86 and 88 of sliding carriage 72. Rollers 78 and 80 are easily removed to facilitate changing mold belt 48. Referring also to FIG. 6, two guide rollers 90 and 91 are located at the points where mold belts 48 and 50 come together at the front end of the conveyors 12 and 14 to further guide mold belts 48 and 50 to a close tolerance side to side match.

Figure 7:
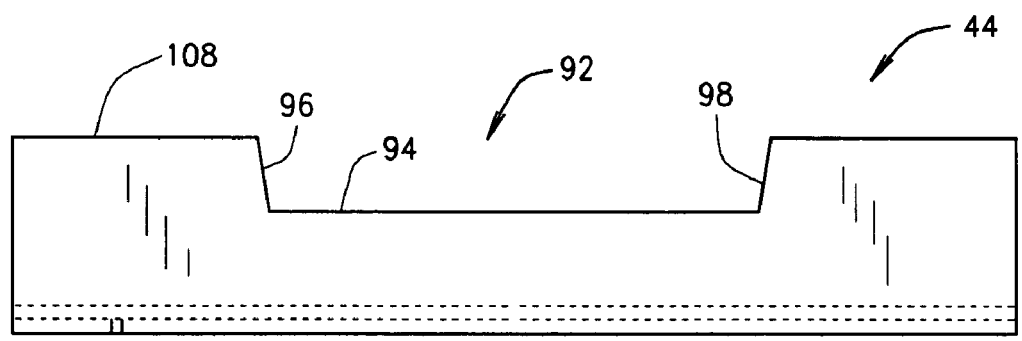
FIG. 7 is a side schematic illustration of a cleat of the continuous production system shown in FIG. 1.
Figure 8:
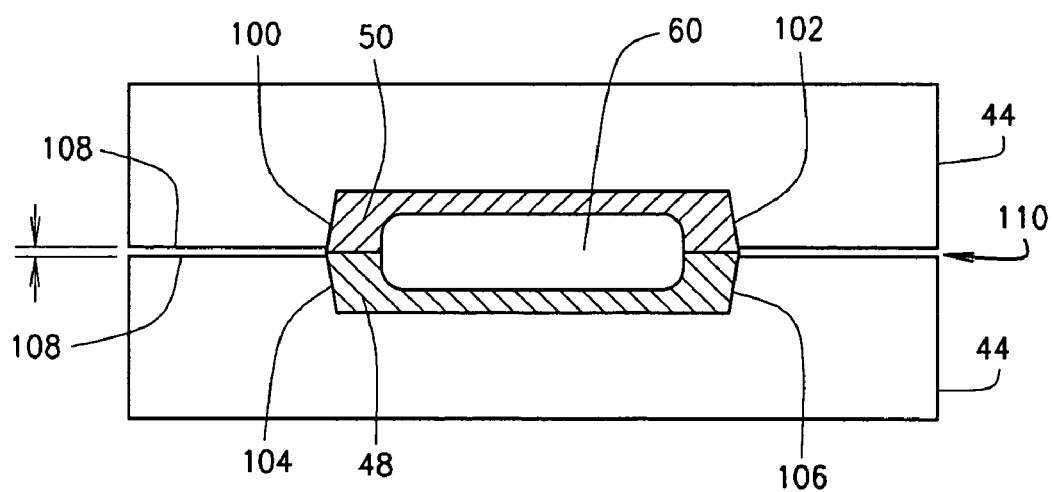
FIG. 8 is a side schematic illustration of opposing cleats of the continuous production system shown in FIG. 1.

Referring also to FIGS. 7 and 8, each cleat 44 includes a notch 92 extending the entire width of cleat 44 that is sized to receive mold belt 48 or mold belt 50. Specifically, notch 92 includes a bottom wall 94 and opposing side walls 96 and 98 extending from bottom wall 94 at an angle that is greater than 90 degrees. Angled side walls 96 and 98 facilitate mold belts 48 and 50 sliding into notch 92 of each cleat 44. Mold belts 48 and 50 include corresponding angled side walls 100, 102, 104, and 106. Notch side walls 96 and 98 provide support to mold belt side walls 100, 102, 104, and 106 which maintain dimensional stability of mold cavity 60.

The height of mold belts 48 and 50 are greater than the depth of notch 92 so that mold belts 48 and 50 extend beyond a face 108 of cleat 44 and into a gap 110 located between opposing cleats 44 attached to cleated belts 16 and 18. Extending into gap 110 permits mold belts 48 and 50 to interface with each other and permits cleated belts 16 and 18 to apply pressure to mold belts 48 and 50 along the interface to prevent leakage of material from mold cavity 60.

Cleated conveyors 12 and 14 are arranged so that faces 108 of cleats 44 mounted on conveyor 12 and faces 108 of cleats 44 mounted on conveyor 14 face each other. In the exemplary embodiment, conveyors 12 and 14 are in a substantially horizontal position and parallel to each other. However, in an alternate embodiment, conveyors 12 and 14 are parallel to each other but are in a position other than horizontal. Conveyor 12 is referred to as the lower conveyor and conveyor 14 is referred to as the upper conveyor. Conveyor 14 is movable away from conveyor 12 to adjust gap 110 between cleated belts 16 and 18. Air cylinders 112 are connected to conveyor 14 to facilitate the movement of upper conveyor 14 relative to lower conveyor 12. Air cylinders 113 are configured to provide positive downward pressure on upper conveyor 14 to impart a positive pressure to mold belts 48 and 50. The number, location along the conveyors, and size of air cylinders 113 can be varied. Air pressure in cylinders 112 can be reversed to provide additional positive downward pressure. When the moldable material is an expanding foam material the positive pressure prevents the expanding foam material from lifting mold belts 48 and 50 apart and applies positive pressure to the moldable material. Positive stops maintain the gap between upper conveyor 14 and lower conveyor 12 to provide the desired product thickness. Also, it has been found that by restraining the expansion of the expanding foam material, the physical properties of the finished molded product is improved, for example, tensile strength, flex strength, flex modulus, and density. In alternate embodiments, other means of imparting a positive pressure can be used, for example, clamps, hydraulic cylinders, weights, adjustable cables, and the like.

Conveyors 12 and 14 are mounted on a first frame assembly 114 which is movably mounted on a second frame assembly 116. Horizontal air cylinders (not shown) move first frame assembly relative to second frame assembly 116 to permit maintenance access to extruders or mixers (not shown) that supply the moldable material to continuous production unit 10 and to permit mold belts 48 and 50 to be easily changed. Motorized screw jacks 118 permit frame assembly 114 to be raised, lowered, and or tilted to match feeding and takeoff equipment (not shown). Wheels 120 coupled to second frame assembly 116 provide for longitudinal movement of continuous production unit 10 towards and away from the source of moldable material.

In operation, a moldable material, for example a polyurethane foam material, is continuously introduced into mold cavity 60 defined by mold belts 48 and 50. The moldable material is introduced into mold cavity 60 at first end portion 31 of forming system 10 and is supplied from any suitable source, for example, an extruder or a mixer. Mold belts 48 and 50 are continuously rotated around idler pulleys 52, 54, 56, and 58 by the movement of cleated belts 16 and 18. As the moldable material travels from first end portion 31 to second end portion 35 of forming system 10, the moldable material foams and cures. The cured molded article exits from forming system 10 at second end portion 35. To prevent mold belts 48 and 50 from being forced apart by the expanding foam, a positive pressure of at least about 10 pounds per square inch (psi) is applied to molding belts 48 and 50 by activating air cylinders 112. Pressures lower than about 10 psi can also be used, however, it has been found that pressures of at least about 10 psi improve the physical properties of the molded article, for example, tensile strength, flex strength, flex modulus, and density.

While the invention has been described in terms of various specific embodiments, those skilled in the art will recognize that the invention can be practiced with modification within the spirit and scope of the claims.

What is claimed is:

1. An apparatus for continuous production of a molded composite product, said apparatus comprising:
    a first, closed loop cleated belt conveyor comprising a first cleated belt with a plurality of cleats and a chain, each said cleat comprising a notch, wherein said plurality of cleats are coupled to said chain with attachment plates;
    a second, closed loop cleated belt conveyor opposed to said first, closed loop cleated belt conveyor comprising a second cleated belt with a plurality of cleats and a chain, each said cleat comprising a notch, wherein said plurality of cleats are coupled to said chain with attachment plates,
    a first endless mold belt positioned at least partially within said notch of said plurality of cleats of said first cleated belt;
    a second endless mold belt positioned at least partially within said notch of the plurality of cleats of said second cleated belt, said first and second endless mold belts being opposed to one another to form a mold cavity, wherein moldable material is introduced to said mold cavity formed between said first and second mold belts;
    a first pressurized air cylinder coupled to said first cleated belt conveyor and configured to provide positive pressure to said mold cavity;
    a heating element for imparting heat to said mold cavity substantially at a first end portion of said apparatus;
    a cooling element for imparting cooling to said mold cavity substantially at a second end portion of said apparatus, wherein the heating and cooling elements together provide control of an operating temperature for the moldable material controlling skin and strength characteristics of the composite product;
    drive sprockets at said second end portion of said apparatus coupled to said chains of said first and said second cleated belts and further coupled to variable speed motors;
    idler sprockets at said first end portion of said apparatus leading the chains around said first end portion of said apparatus and taking up any slack in the chains;
    plates extending a length between said drive sprockets and said idler sprockets of said first and said second cleated belt conveyors; and
    channels in the length of said plates, wherein said chains are disposed in said channels and wherein said channels together with said plates provide support, pressure application and alignment to said chains.

2. An apparatus in accordance with claim 1 further comprising:
    a first frame assembly movably attached to a second frame assembly;
    a motorized screw jack coupled to any lower portion of said apparatus to said first frame assembly, said motorized screw jack permitting said apparatus to be raised or lowered to align said apparatus to a feeding device; and
    a plurality of wheels coupled to said second frame assembly, said wheels providing for a longitudinal movement towards and away from said feeding device.

3. An apparatus in accordance with claim 1 further comprising:
    a second pressurized air cylinder coupled to said first cleated belt conveyor and configured to provide an additional positive pressure to said mold cavity, wherein said first and said second pressurized cylinders are configured to facilitate movement of said first cleated belt conveyor relative to said second cleated belt conveyor and thereby adjust the thickness of a gap between said first and said second mold belts to maintain said moldable material within said mold cavity and improving the physical properties of said composite product.

4. An apparatus in accordance with claim 1 further comprising a first mold belt tracking system coupled to said first cleated belt conveyor, said first mold belt tracking system comprising:
    a stationary carriage fixedly coupled to said first cleated belt conveyor;
    a sliding carriage movably coupled to said stationary carriage; and
    a pair of idler rollers connected to said sliding carriage, wherein said pair of idler rollers support said first mold belt on lateral sides and wherein said sliding carriage together with said pair of idler rollers are configured to move laterally in response to a lateral misalignment of said first mold belt.

5. An apparatus in accordance with claim 4, wherein the first mold belt tracking system further comprises:
a lead screw coupled between said stationary carriage and said sliding carriage to manually adjust the position of said sliding carriage with respect to said stationary carriage; and
two sets of roller pairs guiding said first mold belt from above and below, said two sets of roller pairs further including spring loaded axles for dampening and smoothing any change in said first mold belt alignment.

6. A continuous production system, comprising:
a pair of opposed closed loop cleated belt conveyors spaced apart, each said cleated belt conveyor comprising a cleated belt with a plurality of cleats and a chain attached thereto, each said cleat comprising a notch;
a pair of opposed endless profile first and second mold belts positioned at least partially between said pair of cleated belt conveyors and said cleated belts, said mold belts located at least partially in said notches of said cleats, wherein moldable material is introduced to a mold cavity formed between said first and second mold belts; and
a pressurized air cylinder coupled to a first of the pair of said cleated belt conveyors and configured to provide positive pressure to said mold cavity;
a drive sprocket at a second end portion of said production system coupled to one of the chains of said cleated belt of said first and second cleated belt conveyors and further coupled to a variable speed motor;
an idler sprocket at a first end portion of said production system leading said one of said chains around said first end portion and taking up any slack in said chains;
a plate extending a length between said drive sprocket and said idler sprocket; and
a channel in the length of said plate wherein said one chain is at least partially disposed in said channel and wherein said channel together with said plate provide support and alignment to said one chain.

7. The continuous production system of claim 6, further comprising:
a first frame assembly movably attached to a second frame assembly;
a motorized screw jack coupled to any lower portion of said production system to said first frame assembly, said motorized screw jack permitting said production system to be raised or lowered to align said production system to a feeding device; and
a plurality of wheels coupled to said second frame assembly, said wheels providing for a longitudinal movement towards and away from said feeding device.

8. The continuous production system of claim 7, further comprising:
a heating element for imparting heat to the mold cavity substantially at said first end portion of said production system; and
a cooling element for imparting cooling to the mold cavity substantially at said second end portion of said production system, wherein moldable material is introduced at said first end portion and wherein said heating and said cooling elements together provide control of an operating temperature, said operating temperature providing control of a skin and a strength characteristic of a composite product.

9. A mold belt tracking system for guiding and aligning opposing first and second mold belts positioned at least partially between opposing first and second cleated belt conveyors each said cleated belt conveyor comprising a cleated belt, wherein moldable material is introduced to a mold cavity formed between said first and said second mold belts, said mold belt tracking system comprising:
a stationary carriage fixedly coupled to said first cleated belt conveyor;
a sliding carriage movably coupled to said stationary carriage; and
a pair of idler rollers connected to said sliding carriage, wherein said pair of idler rollers support said first mold belt on lateral sides and wherein said sliding carriage together with said pair of idler rollers are configured to move laterally in response to a lateral misalignment of said first mold belt.

10. The mold belt tracking system of claim 9, further comprising a lead screw coupled between the stationary carriage and the sliding carriage to manually adjust position of the sliding carriage with respect to the stationary carriage.

11. The mold belt tracking system of claim 9, further comprising two sets of roller pairs guiding said first mold belt from above and below, said two sets of roller pairs further including spring loaded axles for dampening and smoothing any change in said first mold belt alignment.

12. The mold belt tracking system of claim 9, further comprising:
a second stationary carriage fixedly coupled to said second cleated belt conveyor;
a second sliding carriage movably coupled to said second stationary carriage; and
a second pair of idler rollers connected to said second sliding carriage, wherein said second pair of idler rollers support said second mold belt on lateral sides and wherein said second sliding carriage together with said second pair of idler rollers are configured to move laterally in response to a lateral misalignment of said second mold belt.

13. The mold belt tracking system of claim 9, further comprising a pair of guide rollers located on opposite sides of a point where said first and said second mold belts come together to further guide said first and said second mold belts to a close tolerance side to side match.

* * * * *